United States Patent

[11] 3,614,285

[72] Inventors: Wolfgang Holzgruber;
Otmar Kleinhagauer; Hermann Geltewa,
all of Kapfenberg, Austria
[21] Appl. No. 40,810
[22] Filed May 27, 1970
[45] Patented Oct. 19, 1971
[73] Assignee Gebr. Boehler & Co. AG
Kapfenberg, Austria
[32] Priority May 27, 1969
[33] Austria
[31] 4974/69

[54] INSTALLATION FOR PRODUCING LARGE BLOCKS OF METALS THROUGH ELECTROSLAG REMELTING
7 Claims, 2 Drawing Figs.

[52] U.S. Cl. .................................................. 13/14
[51] Int. Cl. .................................................. H05b 3/60, H05b 7/12
[50] Field of Search .......................................... 13/13, 14, 15, 17, 10

[56] References Cited
UNITED STATES PATENTS
| | | | |
|---|---|---|---|
| 1,792,293 | 2/1931 | Flodin | 13/14 |
| 3,168,673 | 2/1965 | Edgar | 13/14 X |
| 3,510,562 | 5/1970 | Frauenstein | 13/10 |

Primary Examiner—Bernard A. Gilheany
Assistant Examiner—R. N. Envall, Jr.
Attorney—Arthur O. Klein ABSTRACT: An installation for producing large blocks of metals through electroslag remelting. A plurality of electrodes are disposed vertically with their lower ends dipping into a liquid cooled mold, the electrodes being mounted on individually vertically adjustable electrode holders. Pair of electrode holders are supported on rails for adjustment toward and away from each other, the rails themselves being adjustable toward and away from each other. The installation permits the electrodes to be disposed in an optimum manner to fit mold cavities of various shapes. Mold lifting means may be provided whereby tall metal blocks may be produced.

INSTALLATION FOR PRODUCING LARGE BLOCKS OF METALS THROUGH ELECTROSLAG REMELTING

SPECIFICATION

The invention concerns an installation for producing large blocks of metals, especially of steel, through electroslag remelting. The installation has a liquid cooled mold in which, under a layer of slag, several electrodes are melted down through the development of heat by the electric current passing through them.

This invention has among its objects the creation of an installation for producing large metal blocks through electroslag remelting; the invention allows, on one hand, the melting down of several electrodes at the same time in a liquid cooled iron mold, and makes it possible, on the other hand, to regulate the distance between the electrodes for molds of different profile forms and dimensions for optimum performance. In an illustrative embodiment, there are employed four electrode holders each with its own electrode. Each electrode holder is mounted on its individual column which hangs from a carriage, the hanging column being vertically adjustable with respect to its carriage. The carriages are arranged in two opposed pairs, each such pair being mounted on its individual rail, along which the carriages of the respective pairs are adjustable toward and away from each other. The two rails, each carrying its respective pair of carriages, are adjustable toward and away from each other.

In a preferred embodiment of this installation the mold is provided with side cheeks, which rest upon mold lifts, the mold lifts including mold lift collars movable vertically along fixed vertical columns.

In the following specification we will describe, by way of example, an embodiment which is schematically illustrated in the drawing.

Figure 1:
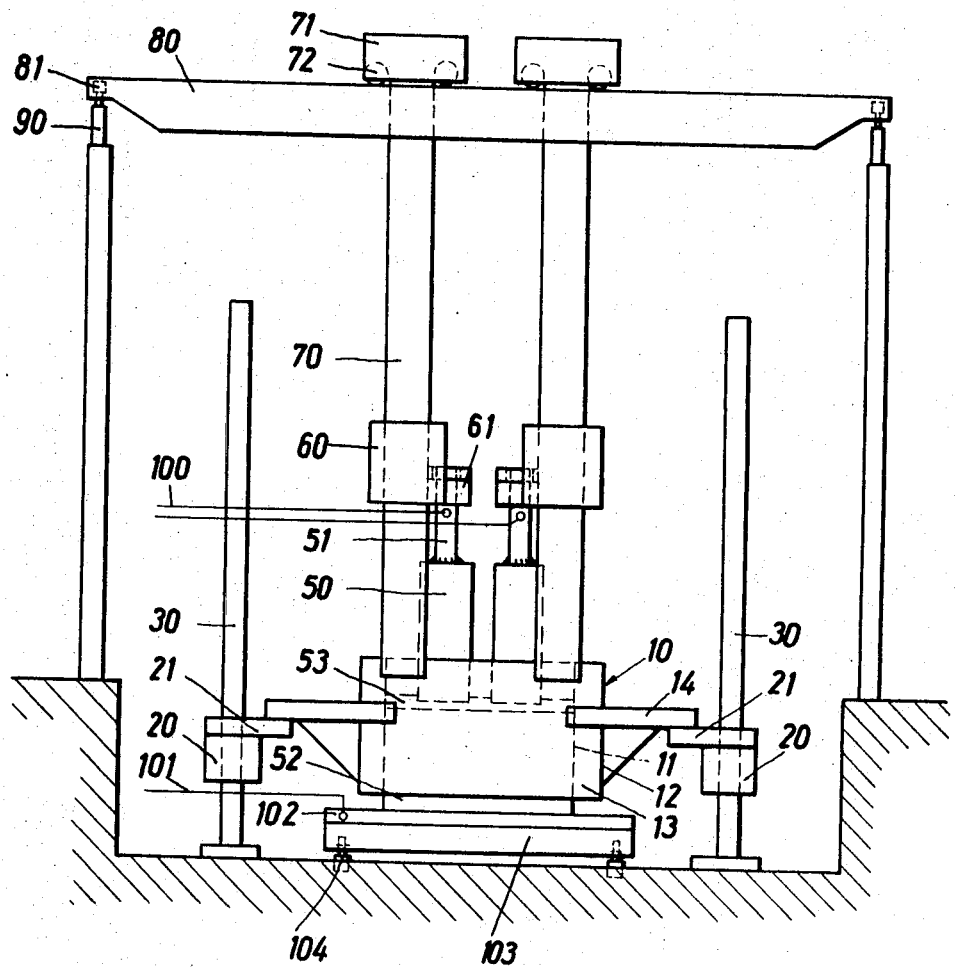
FIG. 1 is a view in vertical section through the installation.

Mold 10, which has an octagonal inner wall 11, rests with its two side cheeks 14 on oppositely facing arm braces 21 of two opposing mold lifts 20. The mold lifting collars 20 are arranged on respective columns 30 of square section. Each of four electrodes 50 consisting of steel to be melted is fastened on the respective arm electrode holder jaw 61 with its elongated electrode shank 51 on its upper end held in the respective one of the electrode holders 60. The electrode holders 60 are each mounted on a column 70 hanging from its individual carriage 71.

Figure 2:
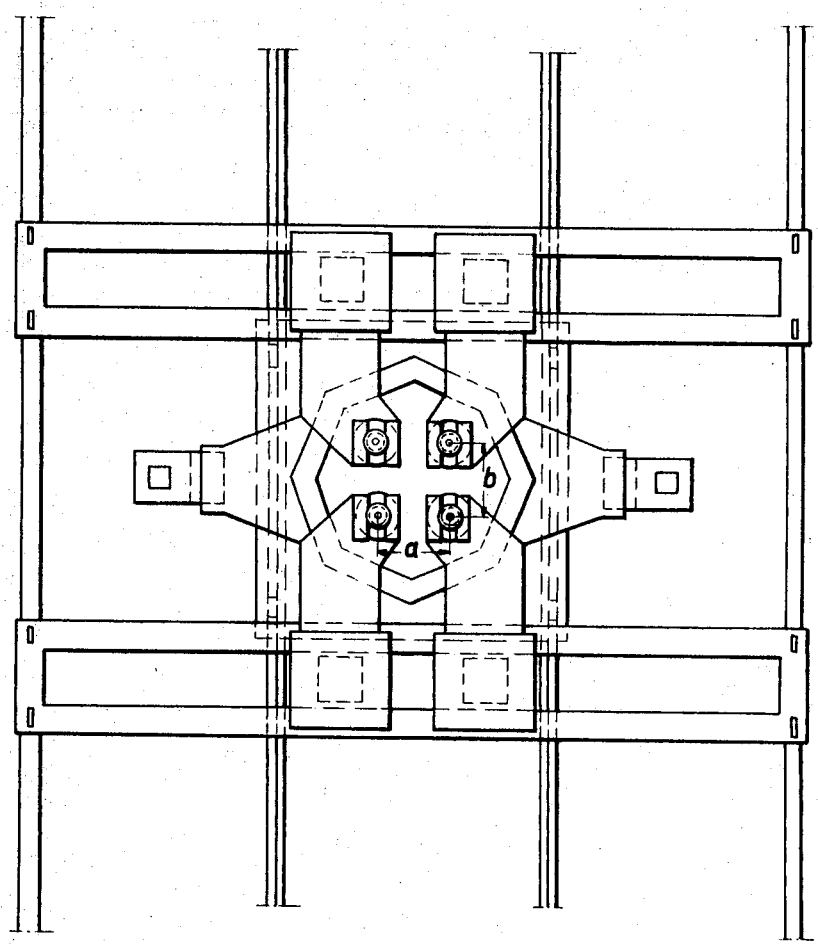
FIG. 2 is a view in plan of the installation.

As shown more clearly in FIG. 2, the columns 70 and their supporting carriages 71 are disposed in two opposed pairs, shown as upper and lower pairs in that figure. Each pair of carriages 71 is supported on a respective crossmember 80, the two crossmembers 80 being parallel to each other and mounted for adjustment toward and away from each other. Thus, members 80 have pairs of rollers 81 on their opposite ends riding along parallel horizontal rails 90 which are supported in elevated position by fixed columns 89. Each carriage 71 has a plurality of wheels 72 which engage the respective crossmember 80 and thus permit the facile adjustment of the carriages 71 toward and away from each other along the rail 80. The adjustment of the crossmembers 80 along the rails 90, as well as the adjustment of the carriages 72 along the crossmembers 80, are preferably accomplished by means of respective power transmission (not shown).

By reason of the adjustment of the crossmembers 80 along rails 90 toward and away from each other, and the adjustment of the carriages 71 along the crossmembers 80 towards and away from each other, the distance a (FIG. 2) between the vertical pairs of electrodes 50, and the distance b between the horizontal pairs of such electrodes may be readily adjusted as desired. The vertical position of each of the electrode holders 60, 61 and thus of the respective electrodes 50 are vertically adjustable with respect to the columns 70 by conventional means such as cable or chain hoists (not shown), there being one such means for each electrode holder 60, whereby the electrode holders may be adjusted vertically independently of each other. Thus, the electrodes 50 may be made to dip into the molten slag in the mold 10 to the desired depth.

As the electrodes 50 are melted down, the level of the molten metal in the mold 10 tends to rise. In order to maintain the level of the molten metal in the mold at a predetermined desired distance below the upper edge of the mold, the mold is progressively raised by means of the mold-raising mechanism 14, 20, 21, above described. Power operated means (not shown) selectively raise the mold-elevating collars 20, and hold them in elevated position as required.

The shanks 51 of the electrodes 50 are connected by a main wire or bus bar 100 to one pole of a source of electric current, the other pole of such source being connected by a wire 101 to a horizontal bottom plate 102, made from metal such as copper, on which the solidified metal block 52 rests. It will be understood that at the start of the process, the mold 10 rests upon the plate 102, the initial arc being drawn between electrodes 50 and the plate 102. The above-mentioned current source may be, for example, a transformer, the wires 100 and 101 being connected to the secondary of such transformer.

During the course of the remelting process, the mold 10 is cooled with water which flows through a cooling jacket 13 provided between the inner wall 11 of the mold and the outer wall 12 thereof. The cooling water enters the jacket 13 through a flexible hose (not shown) at one location, and leaves the mold, preferably at a zone remote from the position of entrance of the water, through another flexible hose (likewise not shown).

The electrically conductive bottom plate 102 is fastened to a carriage 103, as shown. Carriage 103 is provided with supporting wheels 104 which run on suitable tracks 105, as shown. Upon the completion of the remelting process, and after the solidification of the metal at the top of the metal block 52, the mold 10 is raised in order to elevate it above the metal block 52, whereupon such block may be removed from the remelting installation by pulling the carriage 103, with the completed block 52 supported thereon, along the tracks 105 supporting the carriage. A new carriage 103 with a bottom plate 102 may be placed in the installation, or the carriage 103 and plate 102 formerly used may be reinstalled therein. After new electrodes 50 have been put in place, if necessary, the remelting process is resumed.

With the above-described installation, the manufactured blocks 52 are octagonal. With the present installation, blocks of other shapes can be readily formed as desired; among such shapes are those which are circular, rectangular, or square in section. With molds of each of such sections, the electrodes 50 can be readily adjusted as to both the distances a and b between them, so as to place the electrodes in an optimum position for carrying out the remelting process.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In an installation for manufacturing large blocks of metals through electroslag remelting, the installation having a liquid cooled mold in which, under a layer of slag, several electrodes can be simultaneously melted by passing electric current through same, the improvement which comprises a plurality of electrode holders individually adjustable toward and away from the mold whereby to permit the electrodes to dip into the slag to the desired depth, means mounting the electrode holders in pairs which are adjustable toward and away from each other, and means mounting the electrode holder in each pair for adjustment toward and away from each other.

2. An installation according to claim 1, wherein there are four electrode holders arranged in two pairs.

3. An installation according to claim 2, comprising two crossmembers supported parallel to each other above the mold, the two pairs of electrode holders being adjustably supported on the respective crossmembers for movement toward and away from each other, and means for adjusting the crossmember toward and away from each other.

4. An installation according to claim 3, wherein each electrode holder is individually adjustable in both directions along the respective crossmember, and each of the crossmembers is individually adjustable toward and away from the other.

5. An installation according to claim 4, comprising individual carriages on the crossmembers for each of the electrode holders, and a column depending from each such carriage and supporting the respective electrode holder.

6. An installation according to claim 1, wherein the mold is open bottomed and comprises a mold stool plate upon which the mold initially rests, and comprising means for lifting the mold as the level of the metal in the mold melted from the electrodes rises.

7. An installation according to claim 1, comprising a source of electric power, circuit means for connecting the electrodes in parallel to one pole of the electric power source, and means for connecting the mold and the metal melted therein to the other pole of the electric power source.